ELECTRICAL CYCLING TIMER
Filed Nov. 2. 1961
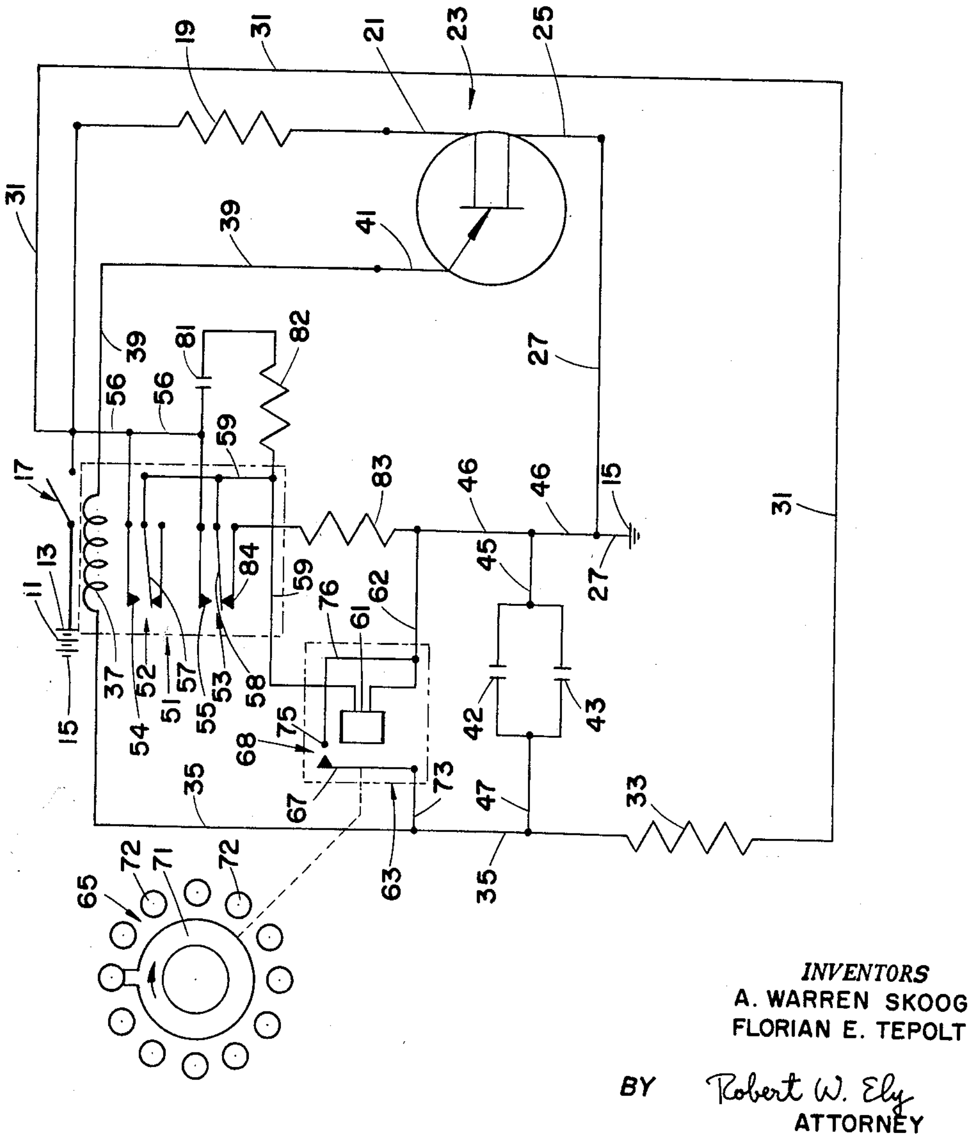
*INVENTORS*
A. WARREN SKOOG
FLORIAN E. TEPOLT
BY Robert W. Ely
ATTORNEY 3,188,502
ELECTRICAL CYCLING TIMER
Arthur W. Skoog, Clinton, and Florian E. Tepolt, Utica, N.Y., assignors to The Bendix Corporation, Oneida, N.Y., a corporation of Delaware
Filed Nov. 2, 1961, Ser. No. 149,615
6 Claims. (Cl. 307—132)

This invention relates to electric timing apparatus and more particularly concerns a cycling timer having PN unijunction transistor control circuit.

An object of the present invention is to provide an improved timer in which an actuating coil is energized at predetermined intervals upon actuation of PN unijunction transistor.

A further object is to provide an electrical cycling apparatus in which capacitance means periodically trigger a PN unijunction transistor so that an actuating coil is energized.

Another object is to provide such an electrical cycling apparatus in which resistance-capacitance means and the transistor cooperate with a control relay and stepper switch to provide operation at predetermined intervals.

An additional object is the provision of such apparatus in which the capacitance means is residually-discharged by operation of the stepper switch so that the control relay circuit is deenergized.

The realization of the above objects along with the features and advantages of the invention will be apparent from the following description and the accompanying drawing.

The drawing is a diagrammatic showing of an electrical timer embodying the invention and shows a stepper switch which is rotated after a predetermined time delay resulting from circuitry having a control relay, PN unijunction transistor, and delay means for triggering the transistor.

Referring to the drawing, the battery or other source of 28-volt direct current 11 has a positive terminal 13 and a negative terminal 15. Negative terminal 15 is also represented by a ground symbol in the lower part of the drawing. The positive terminal 13 is connected to control switch 17 which connects through resistor 19 to the second base connector 21 of the PN unijunction transistor 23. Resistor 19 is a temperature compensating resistor which automatically compensates for changes in ambient temperature to give consistent timing. A first circuit is thus provided from the battery 11 to transistor base 21. The other or first base connector 25 of the transistor 23 has a ground connection provided by a wire 27 connected to ground or the negative terminal 15 of the battery 11. A second circuit is provided from the control switch 17 by wire 31, timing resistor 33, wire 35, actuating or relay coil 37 and wire 39 to the emitter 41 of the transistor 23. This silicon transistor 23 has the characteristic that there is no current flow between its emitter and its first base until the voltage therebetween is 0.56 of the voltage between the two bases or about 22 volts. When this triggering voltage is reached, current flows between the emitter and the first base. Due to timing resistor 33, this triggering voltage is not reached solely via the second circuit from and to the battery 11.

Capacitance means in the form of two capacitors 42 and 43 in parallel is connected to the ground wire 27 of transistor first base connector by wires 45 and 46 and is connected to the second circuit between the timing resistor 33 and the relay coil 37 by wire 47. This arrangement permits capacitors 42 and 43 to provide the triggering voltage for the transistor 23 since the capacitor voltage will be impressed from the emitter 41 to the first base 25. It is apparent that capacitors 42 and 43 are selected so that they build up the transistor triggering voltage and provide an energizing current through actuating or relay coil 37 in cooperation with timing resistor 33.

The relay coil 37 is part of relay 51 (indicated by the dashed line box) which includes two normally-open switches 52 and 53 in parallel.

Contacts 54 and 55 of both switches are connected to control switch 17 by wire 56. The movable elements 57 and 58 are connected to wire 59 which leads to the stepper switch solenoid or coil 61. Solenoid 61 is connected by wire 62 and wire 46 to the ground connection 27 so that, when relay 51 is operated, solenoid 61 is energized.

Solenoid 61 is part of a stepper switch 63 indicated by dashed lines and including rotating switch 65. Stepper switch 63 is shown diagrammatically and is similar to the switch shown in U.S. Patent No. 2,803,814. The solenoid-actuated movable switch element 67 of solenoid switch 68 is mechanically-linked (indicated by the dashed line) to the rotary contact 71 so that it rotates to provide an electrical connection therefrom to the circularly-arranged contacts 72. Contacts 72 can be connected to solenoid valves which control the inflating of different de-icing boot sections on an aircraft.

Stepper switch 63 has its movable switch element 67 connected into the second circuit between relay coil 37 and timing resistor 33 by wire 73 and has its solenoid switch contact 75 connected by wire 76 to the wire 62 providing a ground connection for solenoid 61. With this arrangement, capacitors 42 and 43 are provided with a discharge path when solenoid switch 68 is closed. It is apparent that, when relay 51 is closed, stepper switch 63 will rotate rotary element 71 and will close its solenoid switch 68 so that capacitors 42 and 43 can discharge after having triggered transistor 23 and energize relay coil 37.

Relay 51 is provided with arc suppression means when being de-energized and the movable elements 57 and 58 move to open position. For this purpose, a capacitor 81 and a resistor 82 are connected in series across the movable elements and the normally-open contacts 54 and 55 by being connected to wires 56 and 59. Any charge from capacitor 81 derived from solenoid 61 is discharged by the low-value, bleed-off resistor 83 connected from contact 84 of relay switch 53 to wire 46 which is grounded.

In operation when it is desired to operate stepper switch 63 at predetermined intervals of time, control switch 17 is closed. This establishes a voltage across the two bases of the transistor 23 and initiates a build-up of charge in capacitors 42 and 43. Resistor 33 limits the voltage across the emitter 41 and first base 25 of the transistor 23 to a value much below the triggering voltage. Resistor 33 governs the time required for capacitors 42 and 43 to become sufficiently charged to trigger the transistor 23 and to actuate the relay coil 37. Coil 37 is actuated when the current in the capacitors 42 and 43 builds up to the critical value.

Upon the triggering of transistor 23, the coil 37 is energized to its operating level so that parallel switches 52 and 53 of relay 51 are closed and current is supplied to solenoid 61 of the rotary stepping switch 63. Solenoid 61 when thus energized rotates through the mechanical linkage the rotary contact 71 one step to the next contact 72. The solenoid switch 68 closes so that the capacitors 42 and 43 are discharged through the grounding circuit including wires 35, 73, 76, 62 and 46. Upon discharge of the capacitors 42 and 43, the transistor 23 is de-triggered with the result that relay 51 is de-energized and opens which causes solenoid switch 68 to open. This resets the timing apparatus for operation so that the cycling is repeated automatically. Sparking across relay switches 52 and 53 when their contacts are opened and break the flow of current is minimized by capacitor 81 and resistor 82. The bleed-off resistor 83 quickly discharges the arc-suppression capacitor 81 to protect against metal transfer between the contacts when again closed. The resistor 19 in series with the transistor 23 maintains a consistent timing cycle by automatically compensating for changes in ambient temperature.

From the foregoing, it can be realized that the switching of the transistor 23 is controlled through its emitter circuit by resistor 33 and capacitors 42 and 43 and that the relay coil 37 is actuated when the current in the capacitors builds up to the critical value. The time required for the capacitors to become charged sufficiently to trigger the transistor 23 and to actuate the relay 51 is governed by the value of the resistor 33. The control relay does not require a specific drop-out wattage because the relay coil is in the emitter circuit of the unijunction transistor. The transistor is "shut off" immediately when the solenoid switch shorts out the capacitors. Since, at the start of each cycle, the capacitors are discharged, a uniform time delay starting condition is provided. Thereafter, the capacitors function with the timing resistor to provide a predetermined timing interval and then to actuate and hold the control relay for operation of the stepper switch. It is apparent that, for different timing, other resistors can be conveniently substituted for resistor 33.

In a cycling timer giving a time interval of ten seconds, the characteristics of the components were as follows:

| | |
|---|---|
| Transistor (**23**) | General Electric 2N489. |
| Resistor (**19**) | 1000 ohms. |
| Resistor (**33**) | 100,000 ohms. |
| Capacitors (**42, 43**) | 68 mfd. (each). |
| Coil (**37**) | 400 ohms. |
| Capacitor (**81**) | .25 mfd. |
| Resistor (**82**) | 47 ohms. |
| Solenoid (**61**) | 8 ohms. |
| Resistor (**83**) | 39 ohms. |

It is to be understood that persons skilled in the art can make changes in the disclosed embodiment without departing from the invention as set forth in the appended claims.

What is claimed is:

1. An electrical cycling timer comprised of a PN unijunction transistor having a first base connector, an emitter and a second base connector, a battery, a first circuit connecting said battery through a control switch to said second base connector, said first base connector having a ground connection, a second circuit connecting said control switch through a timing resistor and an actuator coil to said emitter, capacitance means connected to said first base connector and to said second circuit at a point between said actuator coil and said timing resistor, said transistor being triggered when said capacitance means is charged to a predetermined value so that said actuator coil is energized, means operable by said actuator coil when energized to provide after a predetermined fixed time delay a temporary discharge path for said capacitance means and then to open said discharge path, whereby said actuator coil is energized at periodic intervals.

2. An electrical cycling timer comprised of a PN unijunction transistor having a first base connector, an emitter and a second base connector, a battery, a first circuit connecting said battery through a control switch to said second base connector, said first base connector having a ground connection, a second circuit connecting said control switch through a timing resistor and an actuator coil to said emitter, capacitance means connected to said first base connector and to said second circuit at a point between said actuator coil and said timing resistor, said transistor being triggered when said capacitance means is charged to a predetermined value so that said actuator coil is energized, means operable by said actuator coil when energized to provide after a predetermined fixed time delay a temporary discharge path for said capacitance means and then to open said discharge path so that said actuator coil is energized at periodic intervals, said last-mentioned means including a solenoid and a relay operable by said actuator coil, said relay being connected to energize said solenoid, said solenoid having contacts which are part of said discharge path and which close after said fixed delay.

3. An electrical cycling timer comprised of a PN unijunction transistor having a first base connector, an emitter and a second base connector, a battery, a first circuit connecting said battery through a control switch and a temperature compensating resistor to said second base connector, said first base connector having a ground connection, a second circuit connecting said control switch through a timing resistor and an actuator coil to said emitter, capacitance means connected to said first base connector and to said second circuit at a point between said actuator coil and said timing resistor, said transistor being triggered when said capacitance means is charged to a predetermined value so that said actuator coil is energized, a relay having said actuator coil, a solenoid, said relay being connected to energize said solenoid, said solenoid having contacts which close after a fixed time delay and connections which provide a discharge path for said capacitance means when said contacts are closed by said solenoid.

4. An electrical cycling timer comprised of a PN unijunction transistor having a first base connector, an emitter and a second base connector, a battery having a positive terminal and a negative terminal, a first circuit connecting said positive terminal of said battery through a control switch to said second base connector, said first base having a ground connection to the negative terminal of said battery, a second circuit connecting said control switch through a timing resistor and a relay coil to said emitter of said transistor, said relay coil being part of a relay having normally-open switch means, said normally-open switch means connected to said control switch, a stepper switch having an operating coil, said relay switch means being connected to said operating coil of said stepper switch, said stepper switch coil having a connection to said negative terminal of said battery, capacitance means connected to said ground connection of said transistor second base connector and connected to said second circuit between said timing resistor and said relay coil, said capacitance means being such that when charged to a predetermined value it will trigger said transistor and said relay coil will be energized, said stepper switch coil having a return connection to said ground connection of said first base transistor connector so that it will be energized when said relay is actuated, said stepper switch requiring a predetermined fixed time for operation and having means arranged so that said capacitance means is provided with a discharge path, said timing resistor and said capacitance means being such that said transistor, said relay and said stepper switch are operated after predetermined time delays.

5. An electrical cycling timer comprised of a PN unijunction transistor having a first base connector, an emitter and a second base connector, a battery having a positive terminal and a negative terminal, a first circuit connecting said positive terminal of said battery through a control switch and a temperature compensating resistor to said second base connector, said first base having a ground connection to the negative terminal of said battery, a second circuit connecting said control switch through a timing resistor and a relay coil to said emitter of said transistor, said relay coil being part of a relay having normally-open switch means, said normally-open switch means having first contact means and movable means contacting second contact means, said relay coil when energized being constructed to cause contact between said first relay contact means and said relay movable means, said first relay contact means being connected to said control switch, a stepper switch having an operating coil, said relay movable means being connected to said operating coil of said stepper switch, said stepper switch coil having a connection to said negative terminal of said battery, capacitance means connected to said ground connection of said transistor second base connector and connected to said second circuit between said timing resistor and said relay coil, said capacitance means being such that when charged to a predetermined value it will trigger said transistor and said relay coil will be energized, said stepper switch coil requiring a predetermined fixed time for operation and having a return connection to said ground connection of said first base transistor connector so that it will be energized when said relay is actuated, said stepper switch having a contact and movable element arranged to be closed when said stepper switch coil is energized, said stepper switch contact being connected to said return connection of said stepper switch coil, said stepper switch movable element being connected to said second circuit between said timing resistor and said relay coil so that when said stepper switch is closed upon the closing of said relay said capacitance means is provided with a discharge path, said timing resistor and said capacitance means being such that said transistor, said relay and said stepper switch are operated after predetermined time delays.

6. An electrical cycling timer comprised of a PN unijunction transistor having a first base connector, an emitter and a second base connector, a battery having a positive terminal and a negative terminal, a first circuit connecting said positive terminal of said battery through a control switch and a temperature compensating resistor to said second base connector, said first base having a ground connection to the negative terminal of said battery, a second circuit connecting said control switch through a timing resistor and a relay coil to said emitter of said transistor, said relay coil being part of a relay having normally-open switch means, said normally-open switch means having first contact means and movable means contacting second contact means, said relay coil when energized being constructed to cause contact between said first contact means and said movable means, said first contact means being connected to said control switch, a stepper switch having an operating coil, said movable means being connected to said operating coil of said stepper switch, said stepper switch coil having a connection to said negative terminal of said battery, capacitance means connected to said ground connection of said transistor second base connector and connected to said second circuit between said timing resistor and said relay coil, said capacitance means being such that when charged to a predetermined value it will trigger said transistor and said relay coil will be energized, said stepper switch coil having a return connection to said ground connection of said first base transistor connector so that it will be energized when said relay is actuated, said stepper switch having a contact and movable element arranged to be closed when said stepper switch coil is energized, said stepper switch contact being connected to said return connection of said stepper switch coil, said stepper switch movable element being connected to said second circuit between said timing resistor and said relay coil so that when said stepper switch is closed upon the closing of said relay said capacitance means is provided with a discharge path, said timing resistor and said capacitance means being such that said transistor, said relay and said stepper switch are operated after predetermined time delays, arc suppression means including a capacitor connected across said relay movable means and said first relay contact means for offsetting the inductive effect of said stepper switch coil, said second contact means being connected through a resistor to said return connection of said stepper switch coil, said second contact means being connected through a resistor to said return connection of said stepper switch coil to provide a discharge path for said arc suppression capacitor.

References Cited by the Examiner

UNITED STATES PATENTS

| | | | |
|---|---|---|---|
| 2,927,259 | 3/60 | Neal | 317—148.5 |
| 2,964,625 | 12/60 | Brockett | 317—142 |

FOREIGN PATENTS

| | | |
|---|---|---|
| 815,361 | 6/59 | Great Britain. |

LLOYD McCOLLUM, *Primary Examiner.*